United States Patent
Mossman et al.

(10) Patent No.: US 11,138,649 B2
(45) Date of Patent: Oct. 5, 2021

(54) SERVER, METHOD, AND COMPUTER-READABLE STORAGE MEDIUM FOR IDENTIFYING COMPUTING DEVICES WITH GEOGRAPHIC PROXIMITY TO DESIRED ITEM ATTRIBUTES

(71) Applicant: eBay Inc., San Jose, CA (US)

(72) Inventors: Matthew Scott Mossman, Portland, OR (US); Ann Marie Kim Manzitti Mossman, Portland, OR (US)

(73) Assignee: eBay Inc., Sao Jose, CA (US)

( * ) Notice: Subject to any disclaimer, the term of this patent is extended or adjusted under 35 U.S.C. 154(b) by 351 days.

(21) Appl. No.: 15/945,967

(22) Filed: Apr. 5, 2018

(65) Prior Publication Data
US 2019/0311421 A1 Oct. 10, 2019

(51) Int. Cl.
*G06Q 30/00* (2012.01)
*G06Q 30/06* (2012.01)
*G06Q 10/08* (2012.01)
*G06F 16/909* (2019.01)
*G06F 16/9537* (2019.01)

(52) U.S. Cl.
CPC ....... *G06Q 30/0627* (2013.01); *G06F 16/909* (2019.01); *G06F 16/9537* (2019.01); *G06Q 10/087* (2013.01); *G06Q 30/0639* (2013.01)

(58) Field of Classification Search
CPC ... G06Q 30/0601–0645; G06Q 10/087; G06Q 30/0627; G06Q 30/0639; G06F 16/909; G06F 16/9537
USPC ...................... 705/26.1–27.2, 26.9, 26.63, 28
See application file for complete search history.

(56) References Cited

U.S. PATENT DOCUMENTS

| 6,493,724 B1 * | 12/2002 | Cusack ................. G06F 19/366 |
| 8,335,722 B2 | 12/2012 | Lee et al. |
| 8,401,911 B1 | 3/2013 | Chu et al. |
| 8,963,740 B2 | 2/2015 | Koukoumidis et al. |
| 8,972,418 B2 | 3/2015 | Panchadsaram et al. |
| 9,159,030 B1 | 10/2015 | Maennel |
| 2002/0147651 A1 | 10/2002 | Hoar et al. |

(Continued)

FOREIGN PATENT DOCUMENTS

WO 2019/195023 A1 10/2019

OTHER PUBLICATIONS

Ryan, Tom. Locally.com Lets Consumers See Inventory at Nearby Shops. Jul. 1, 2016. Retail Wire. Accessed via https://www.retailwire.com/discussion/locally-com-lets-consumers-see-inventory-at-nearby-shops/ (Year: 2016).*

(Continued)

*Primary Examiner* — Allison G Wood
(74) *Attorney, Agent, or Firm* — Schwegman Lundberg & Woessner, P.A.

(57) ABSTRACT

A server receives a description of an item from a first computing device. The server determines attributes of the item based on the description of the item. The server identifies a geographic region based on the attributes of the item. The server identifies a second computing device that is located in the geographic region and generates a first query to the second computing device. The server receives additional item data based on a physical presence of the item in the geographic region from the second computing device. The server updates attributes data of the item in the database with the additional item data received from the second computing device.

20 Claims, 10 Drawing Sheets

(56) References Cited

U.S. PATENT DOCUMENTS

| | | |
|---|---|---|
| 2006/0287995 A1 | 12/2006 | Quince |
| 2012/0095978 A1* | 4/2012 | Levin ................ G06Q 30/02 707/706 |
| 2013/0151381 A1* | 6/2013 | Klein ............. G06Q 30/0641 705/27.1 |
| 2013/0159144 A1* | 6/2013 | Higgins ........... G06Q 30/0601 705/26.81 |
| 2014/0067745 A1 | 3/2014 | Avey et al. |
| 2015/0006335 A1* | 1/2015 | Vasantham ......... G06Q 20/203 705/28 |
| 2015/0031388 A1* | 1/2015 | Chatterjee ........ G06Q 30/0639 455/456.1 |
| 2015/0206258 A1 | 7/2015 | Charkov et al. |

OTHER PUBLICATIONS

International Search Report received for PCT Application No. PCT/US2019/023973, dated May 22, 2019, 3 pages.
International Written Opinion received for PCT Application No. PCT/US2019/023973, dated May 22, 2019, 6 pages.
Mossman et al., "81984—Building loyalty to eBay through achievements", Jun. 14, 2017, 3 pages.
Mossman, "82331—Personal Shopper Matching Service", Sep. 1, 2017, 2 pages.
Ploschke, "81430—The buyers marketplace—PSA, your personal shopping assistant and marketplace", Jun. 17, 2016, 2 pages.
International Preliminary Report on Patentability received for PCT Application No. PCT/US2019/023973, dated Oct. 15, 2020, 8 Pages.

* cited by examiner

SERVER, METHOD, AND COMPUTER-READABLE STORAGE MEDIUM FOR IDENTIFYING COMPUTING DEVICES WITH GEOGRAPHIC PROXIMITY TO DESIRED ITEM ATTRIBUTES

TECHNICAL FIELD

Embodiments of the present disclosure relate generally to a data system. More particularly, the present disclosure relates to item identification from records external to a system.

BACKGROUND

Records of items for sale in an online marketplace application are typically stored in a database system. Some rare or unique items are not readily available in the online marketplace application because the items may be available in limited markets (e.g., for example, only in Japan). In other situations, the unique items cannot be located on the database system because there are no records of the unique item itself.

Prior art techniques for searching for a unique item that is not readily available in the database system include manually searching for the item in physical stores or requesting leads or recommendation from people knowledgeable about the unique item. As such, searching for a unique item or an item not readily available is performed offline (i.e., calling retailers).

These prior art techniques leads to inefficiencies in using current online market place applications. A rare or unique item has to sometimes be searched over and over again or browsed for hours on end by a would-be-purchaser until the item is found, requiting the prospective searcher to spend precious time and in the process waste valuable computing resources. Indeed, even bringing online the manual approach of searching for an item or introducing a request from an expert into an online forum has inherent limitations, as there may be a mismatch between how the user describes the sought-after-item and how the online store or expert describes the rare item.

Further, sellers wishing to provide online listings for rare and unique items may have difficulty in discerning whether a rare or unique item, if listed, would in fact be in demand by purchasers. The result is that many "graveyard" listings are created that continue to occupy memory without serving any consumer. Even though a seller may be very near or have possession of a rare item that is currently of interest in the market, the seller may not know until that interest exists until he or she creates a listing to test market demand.

The present disclosure seeks to address these problems by providing improved technology and technical benefits.

BRIEF DESCRIPTION OF THE DRAWINGS

Various ones of the appended drawings merely illustrate example embodiments of the present disclosure and cannot be considered as limiting its scope.

Figure 1:
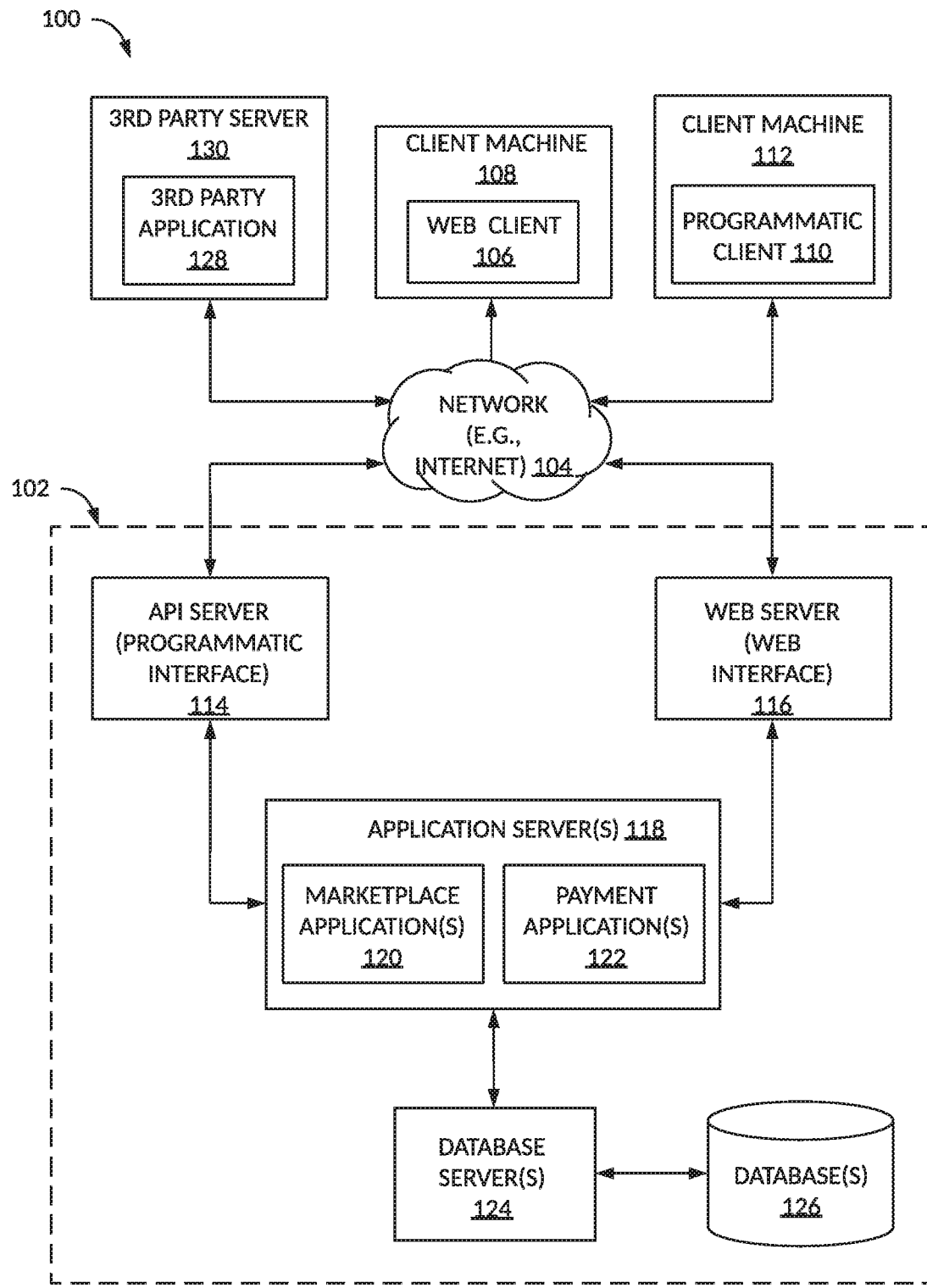
FIG. 1 is a network diagram depicting a client-server system, within which one example embodiment may be deployed.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter.

A database can store attributes of items with unique identifiers that identifies the items. However, some databases may be incomplete because of missing information or the lack of entry related to an item. An item can be a physical product (e.g., a shoe) or an intangible product (e.g., music or video file). For example, an online database may not include entries related to an item found in an attic because the item is no longer sold or the item does not appear in any online database of any online retailer. Therefore, locating such an item in an online database presents some difficulty because of potentially missing information, inaccurate information, or unavailable information. The item may not be present or listed in any online database. The present application seeks to address this problem (e.g., missing or unavailable information of an item in a database) by providing a system for receiving a description of an item, identifying attributes related to the item, identifying client devices that can retrieve information related to the item based on the attributes of the item, sending a query to the identifies client devices, requesting the information from the identified client devices, and updating the database with the missing information. The attributes can include a geographical source or origin of the item.

In various example embodiments, a server receives a description of an item from a first computing device. The server determines attributes of the item based on the description of the item. An online presence indicator is computed based on the identified attributes of the item. The server identifies a geographic region based on the attributes of the item in response to at least one of the item not being listed in the database and the online presence indicator transgressing a low online presence indicator threshold. The server identifies a second computing device that is located in the geographic region and generates a first query to the second computing device. The server receives additional item data based on a physical presence of the item in the geographic region from the second computing device. The additional item data comprises an indicator of the physical presence of the item at the geographic region. The server updates attributes data of the item in the database with the additional item data received from the second computing device.

In one example embodiment, the server determines a description attribute, a unique identifier attribute, a geographical attribute, and an item category attribute based on the description of the item. The online presence indicator represents a presence of the item in various online databases of retailers/merchants. For example, if the item is described in several databases regardless of its availability or stock (e.g., regardless of whether the item is in or out of stock at several retailers), the online presence indicator of the item would be relatively high. However, if the item is described in a few databases regardless of its availability or stock, the online presence indicator of the item would be relatively low. For example, unique or rate items at antique shops are rarely listed in an online database, much less in online databases of major retailers. Other examples of items include items without a SKU number that are custom made or unique.

In another example embodiment, the online presence indicator represents a present availability of the item (e.g., item in stock) in various online databases of retailers/merchants. For example, if the item is shown as readily available in several databases, the online presence indicator of the item would be relatively high. However, if the item is in a low inventory in several databases, the online presence indicator of the item would be relatively low.

In one example embodiment, the online presence indicator is computed by querying other servers with the attributes of the item. The server determines an online inventory status of the item based on the responses from the queries. The online presence indicator corresponds to a level of the online inventory status. The online presence indicator indicates a poor online presence status when the online presence indicator is below the low online presence indicator threshold. The online presence indicator indicates an online presence status when the online presence indicator is above the low online presence indicator threshold. The server identifies the geographic region in response to the online presence indicator indicating the poor online presence status.

In another example embodiment, the server computes an online presence indicator by querying other servers with the attributes of the item. The server determines an online inventory status of the item based on the responses from the queries. The online presence indicator corresponds to a level of the online inventory status. The online presence indicator indicates an offline presence status when the online presence indicator is below an offline presence indicator threshold. The offline presence status indicates that the item is not in stock or does not exist in databases of the other servers. The server identifies the geographic region in response to the online presence indicator indicating the offline presence status.

In another example embodiment, the server computes an online presence indicator by querying other servers with the attributes of the item. The server determines an online inventory status of the item based on the responses from the queries. The online presence indicator corresponds to a level of the online inventory status. The online presence indicator indicates a poor online presence status when the online presence indicator is below the low online presence indicator threshold. The online presence indicator indicates a medium online presence status when the online presence indicator is above the low online presence indicator threshold and a medium online presence threshold. The online presence indicator indicates a high online presence status when the online presence indicator is above the medium online presence indicator threshold.

In another example embodiment, the size of the geographic region increases in response to the low online presence status of the item. The size of the geographic region decreases in response to determining the high online presence status of the item.

In another example embodiment, the server identifies a third computing device associated with an expert user account. The third computing device is already registered with the server. The expert user account identifies the user as an expert related to the item category attribute. The server generates a second query to the third computing device. The second query identifies the attributes of the item.

In another example embodiment, the server identifies a third computing device associated with an expert user account. The third computing device is already registered with the server. The expert user account identifies the user as an expert related to the item category attribute. The server determines that the third computing device is located in the geographic region and generates a second query to the third computing device in response to determining that the third computing device is located in the geographic region. The second query identifies the attributes of the item.

In another example embodiment, the server identifies a third computing device associated with an expert user account. The third computing device is already registered with the server. The expert user account identifies the user as an expert related to the item category attribute. The server determines that the third computing device is located within a preset range of the geographic region and generates a second query to the third computing device in response to determining that the third computing device is located within the preset range of the geographic region. The second query identifies the attributes of the item.

FIG. 1 is a network diagram depicting a client-server system 100, within which one example embodiment may be deployed. A networked system 102, in the example forms of a network-based marketplace or publication system, provides server-side functionality, via a network 104 (e.g., the Internet or a Wide Area Network (WAN)) to one or more clients. FIG. 1 illustrates, for example, a web client 106 (e.g., a browser, such as the Internet Explorer browser developed by Microsoft Corporation of Redmond, Wash. State) and a programmatic client 110 executing on respective client machines 108 and 112.

An application programming interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more database servers 124 that facilitate access to one or more databases 126.

The marketplace applications 120 may provide a number of marketplace functions and services to users who access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the embodiments are, of course, not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 110 accesses the various services and functions provided by the marketplace and payment applications 120 and 122 via the programmatic interface provided by the API server 114. The programmatic client 110 may, for example, be a seller application (e.g., the TurboLister application developed by eBay Inc., of San Jose, Calif.) to enable sellers to author and manage listings on the networked system 102 in an offline manner, and to perform batch-mode communications between the programmatic client 110 and the networked system 102.

FIG. 1 also illustrates a third-party application 128 executing on a third-party server machine 130, as having programmatic access to the networked system 102 via the programmatic interface provided by the API server 114. For example, the third-party application 128 may, utilizing information retrieved from the networked system 102, support one or more features or functions on a website hosted by a third party. The third-party website may, for example, provide one or more promotional, marketplace, or payment functions that are supported by the relevant applications of the networked system 102.

Figure 2:
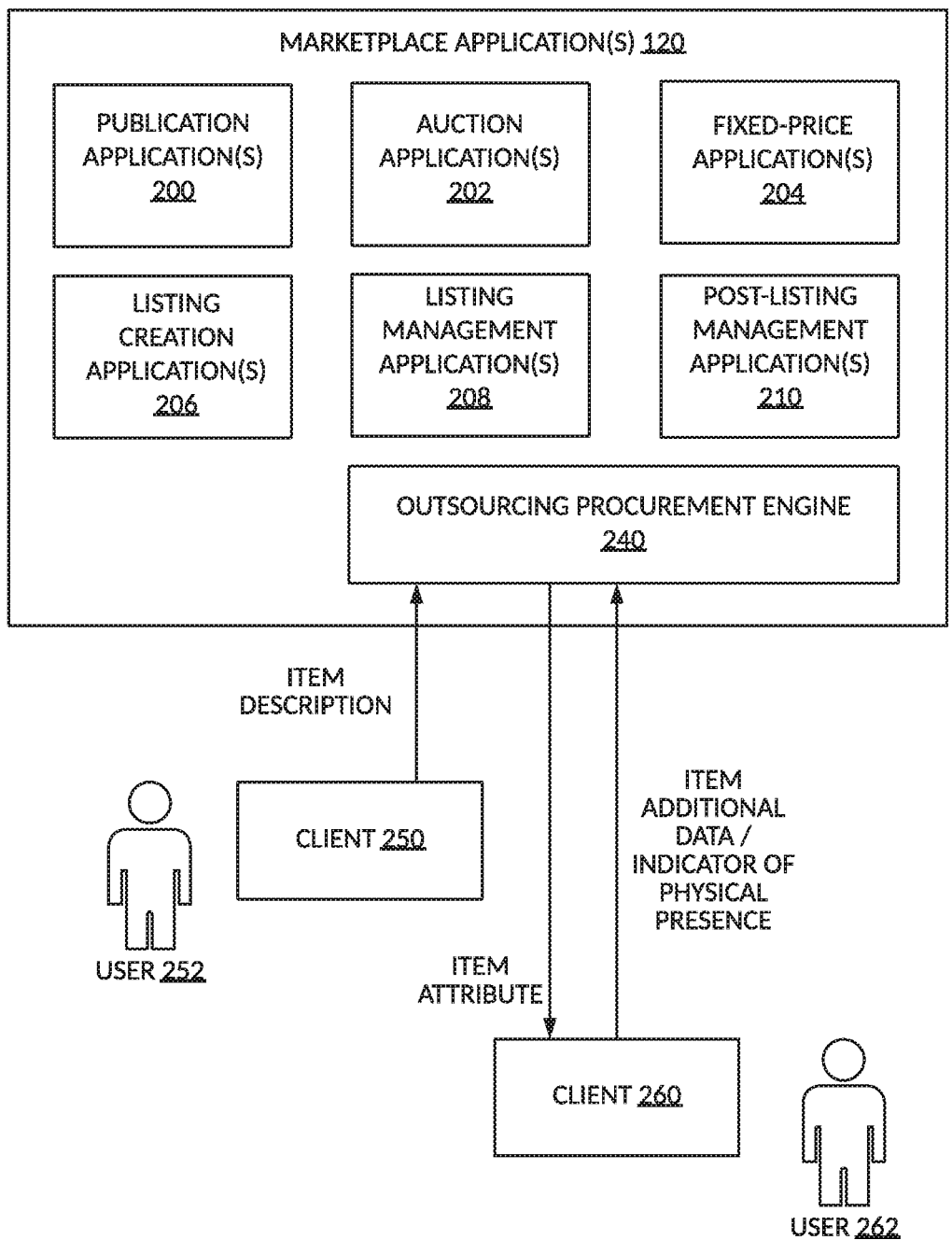
FIG. 2 is a block diagram illustrating marketplace applications that, in one example embodiment, are provided as part of a networked system.

FIG. 2 is a block diagram illustrating marketplace applications 120 that, in one example embodiment, are provided as part of the networked system 102. The marketplace applications 120 may be hosted on dedicated or shared server machines (not shown) that are communicatively coupled to enable communications between or among server machines. The marketplace applications 120 themselves are communicatively coupled (e.g., via appropriate interfaces) to each other and to various data sources, so as to allow information to be passed between or among the marketplace applications 120 or so as to allow the marketplace applications 120 to share and access common data. The marketplace applications 120 may furthermore access one or more databases 126 via the database servers 124.

The networked system 102 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 120 are shown to include at least one publication application 200 and one or more auction applications 202, which support auction-format listing and price setting mechanisms (e.g., English, Dutch, Vickrey, Chinese, Double, Reverse auctions, etc.).

The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed price that is typically higher than the starting price of the auction.

Listing creation applications 206 allow sellers to conveniently author listings pertaining to goods or services that they wish to transact via the networked system 102, and listing management applications 208 allow sellers to manage such listings. Specifically, where a particular seller has authored and/or published a large number of listings, the management of such listings may present a challenge. The listing management applications 208 provide a number of features (e.g., auto-relisting, inventory level monitors, etc.) to assist the seller in managing such listings. One or more post-listing management applications 210 also assist sellers with a number of activities that typically occur post-listing.

An outsourcing procurement engine 240 receives item descriptions from user 252 of a client 250 operating an application configured to communicate with the marketplace application 120. An item description, includes, for example, a description of a physical good that the user 252 is looking for. The outsourcing procurement engine 240 determines whether the item is readily available online by querying inventory-level databases from retailers and other sellers. For example, the item may be a very popular item or sold out item that may not be available online. In another example, the item may be available in limited quantities at select physical outlets. In yet another example, the item is not listed or sold online. This type of item is also referred to as an offline item.

The outsourcing procurement engine 240 identifies a geographic region associated with the item (e.g., the item is produced or manufactured in the geographic region, other related items are manufactured or originate from that geographic region) or identifies users having an expertise with the type of item (e.g., Napa Valley wine). The outsourcing procurement engine 240 sends the item attributes to the client 260 of a user 262 (who may or may not be an expert associated with the item sought by the user 252). The client 260 may or may not be located within a geographic region associated with the item. The user 262 can look for the item (on behalf of the user 252) using the item attributes. The client 260 may operate an application that is configured to communicate with the marketplace application 120 (via an application or a web browser). The client 260 and the user 262 may already be registered with the marketplace application 120. Once the user 262 finds an item corresponding or matching the item attributes, the user 262 provides additional item data (e.g., picture of the wine label, further description of the wine, SKU number not previously available for that wine, local opinion/reputation of the wine, or any other additional data not readily available online and based on the presence of the physical item (e.g., wine color looks ruby red and tastes bitter)). The client 260 provides, to outsourcing procurement engine 240, the additional item data along an indicator of a physical presence of the physical item (e.g., there are only 5 bottles currently available in stock, and 10 cases will be available tomorrow). The application server 118 updates attributes data related to the item in database 126 with the additional data and the indicator of the physical present of the physical item.

It should be noted that the term "web browser" as used in this disclosure shall be interpreted broadly to cover any application capable of displaying item attributes and rendering images from a web server. As such, this may include traditional web browsers as well as stand-alone applications (or apps) operating on mobile or other devices. For example, the web browser could be a traditional web browser such as Internet Explorer from Microsoft Corp., a stand-alone app such as a shopping application, a video player app, etc.

In another example where the web browser is a stand-alone app, it may be operating on, for example, a mobile device having a display and a camera. The techniques described herein could therefore be applied to an image obtained by the mobile device from an outside source, such as via the Internet, an image previously stored on the mobile device, or an image taken by the camera on the mobile device, potentially in real time. Indeed, the techniques described herein can be applied on any device that is capable of obtaining a digital image and transmitting portions of that digital image to another device. Mobile devices are certainly one example, but others are possible as well, such as wearables and head-mounted devices.

Embodiments where the camera is used in real time to capture images on which the techniques described in this document are applied may also be useful in virtual reality or augmented reality device. For example, a camera in an augmented reality device may capture an image while simultaneously overlaying graphics or other images over the captured image. The techniques described herein can be applied to the captured image or the composite image formed by the combination of the captured image and the overlay(s).

Figure 3:
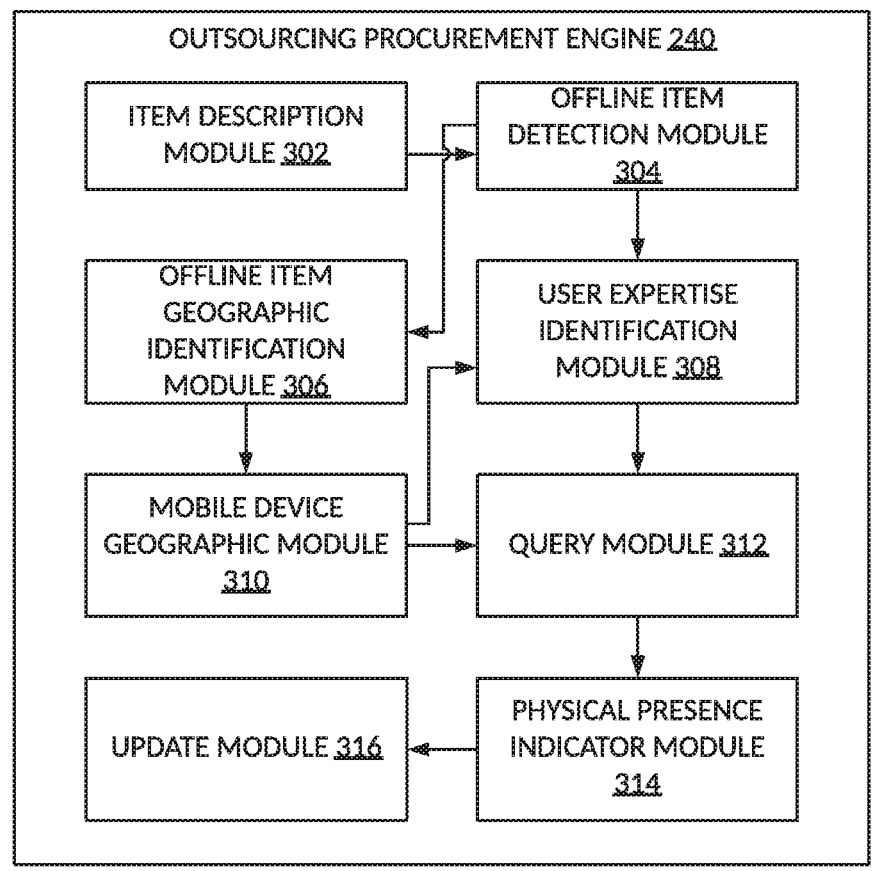
FIG. 3 is a block diagram illustrating an example embodiment of outsourcing procurement engine.

FIG. 3 is a block diagram illustrating an example embodiment of the outsourcing procurement engine 240. The outsourcing procurement engine 240 includes, for example, an item description module 302, an offline item detection module 304, an offline item geographic identification module 306, a user expertise identification module 308, a mobile device geographic module 310, and a query module 312. The item description module 302 receives the item descriptions from the client 250. An item description includes, for example, a type of item, a name of the item, a color of the item, a country of origin, a place of production, a unique identifier such as a model number of a brand. Other types of descriptions include written descriptions, pictures, or videos. In another example embodiment, the item description module 302 generates attributes based on the received description of the item. For example, a regional geographic location attribute with a value of "Napa" is generated based on the word "Napa Valley wine."

The offline item detection module 304 determines whether the item cannot be found online (e.g., not listed in online retailers) or has limited inventory online (e.g., less than 10 items available in the entire United States). In one example embodiment, the offline item detection module 304 queries for inventory levels of databases of online retailers. In another example, the offline item detection module 304 queries databases of online retailers for the item based on a unique identification of the item brand and model number or serial number) for a listing of similar items.

The offline item geographic identification module 306 determines a geographical region (e.g., Napa Valley) based on the attributes generated by the item description module 302 and the lack of online availability (e.g., low inventory level or non-existent listing) as determined by the offline item detection module 304. The geographical region may be a country (e.g., Japan) based on a type of item attribute (e.g., anime figurine). In another example embodiment, the offline item geographic identification module 306 may adjust a size of the region based on an availability of the item online. For example, the size of the region may be larger when the inventory of the item online is low. The size of the region may be smaller when the inventory of the item online is high.

In another example embodiment, the item may be a newly released, popular item that is not available online and is sold out in retail stores. The offline item geographic identification module 306 determines geographic areas or regions based on the number of retail stores that have listed or sold the item. In another example, the offline item geographic identification module 306 determines geographic areas or regions based on a density of population having a profile associated with the item (e.g., regions with high millennial population associated with the popularity of the item with millennials).

The mobile device geographic module 310 identifies mobile devices of users registered with the marketplace application 120 and located within the identified geographic region determined by offline item geographic identification module 306.

The user expertise identification module 308 identifies users that have indicated that have an expertise in a field associated with one or more attributes of the item. For example, a user may have identified themselves as an expert in sports equipment. In another example, a user may have identified themselves as a red wine expert. The user expertise identification module 308 identifies users that are located in the geographic region with the mobile device geographic module and users that have expert attributes corresponding to one or more attributes of the item. In another example embodiment, the user expertise identification module 308 determines users that have expert attributes corresponding to one or more attributes of the item irrespective of a geographic location attribute of the item.

The query module 312 generates a query that includes attributes of the item. In one example embodiment, the query includes an amount attribute that indicates how much the user 252 is willing to pay for the item. In one example embodiment, the query module 312 generates a query to mobile devices that are located in the geographic region determined by the offline item geographic identification module 306. In another example embodiment, the query module 312 generates a query to mobile devices of expert users (in the field of the item) that are located in the geographic region determined by the offline item geographic identification module 306. In another example embodiment, the query module 312 generates a query to mobile devices of expert users (in the field of the item) that are located within a preset range (e.g., within 10 miles) of the geographic region determined by the offline item geographic identification module 306.

The physical presence indicator module 314 receives additional data of the item. The additional data includes an indicator of a physical presence of the item in the geographic region. The additional data is based on the item being found in the geographic region. The additional data include, for example, data not previously stored by the database 126 because the information was missing for the item. An example of missing attribute data may include a SKU number because some items may not have a SKU number. Another example of missing attribute data may include physical characteristics related to the item (e.g., color, material, sturdiness, weight, size, condition, asking price) that were not previously known to the database 126 for the item. The indicator may identify, for example, that the item is present, not present, will be present at a specified future time.

The update module 316 receives the additional data from the physical presence indicator module 314 and updates the database 126 with the additional data for the item. The additional data is further reported back to the client 250.

Figure 4:
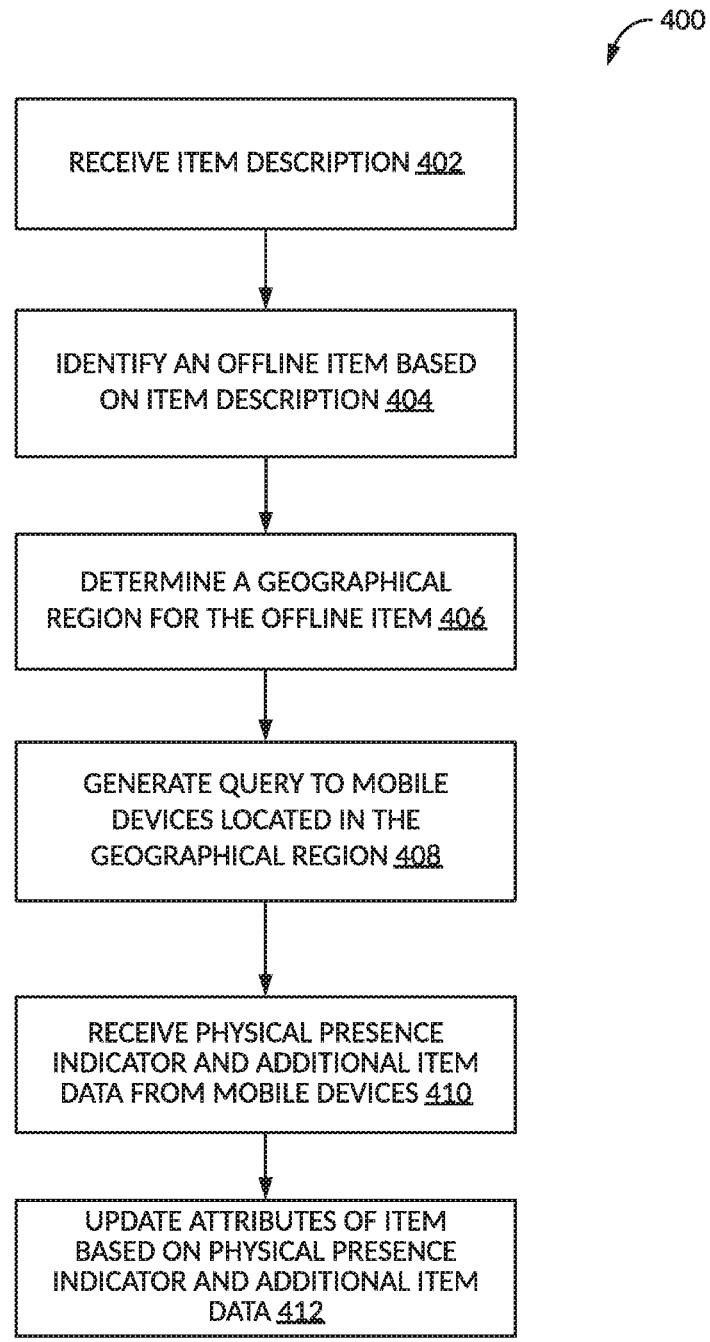
FIG. 4 is a flow diagram illustrating a method for operating an outsourcing procurement engine, in accordance with an example embodiment.

FIG. 4 is a flow diagram illustrating a method 400 for operating an outsourcing procurement engine, in accordance with an example embodiment. At operation 402, the server receives an item description. At operation 404, the server determines that the item description indicates an offline item and identifies the offline item based on the item description. At operation 406, the server identifies geographical regions associated with the item. At operation 408, the server generates a query to mobile devices that are located in the geographical region. At operation 410, the server receives additional item data (including the physical presence indicator) from the mobile devices that have located the item (or an item matching the item description/attributes). At operation 412, the server updates its database of items based on the additional item data received at operation 410.

Figure 5:
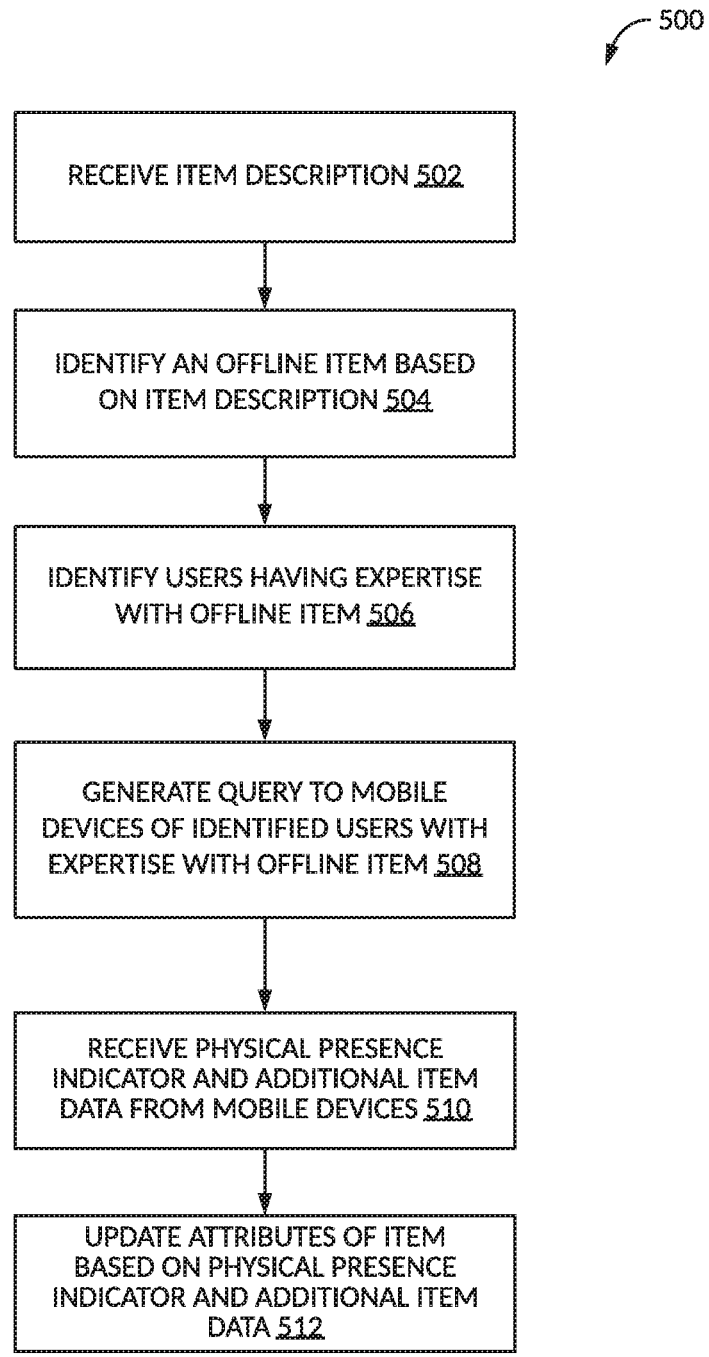
FIG. 5 is a flow diagram illustrating a method for operating an outsourcing procurement engine, in accordance with another example embodiment.

FIG. 5 is a flow diagram illustrating a method 500 for operating an outsourcing procurement engine, in accordance with another example embodiment. At operation 502, the server receives an item description. At operation 504, the server identifies an offline item based on the item description. At operation 506, the server identifies users having expertise in a field related to the offline item. At operation 508, the server generates a query to the mobile device of the identified users with expertise in the field of the offline item. At operation 510, the server receives additional item data (including the physical presence indicator) from the mobile devices that have located the item (or an item matching the item description/attributes). At operation 512, the server updates its database of items based on the additional item data received at operation 510.

Figure 6:
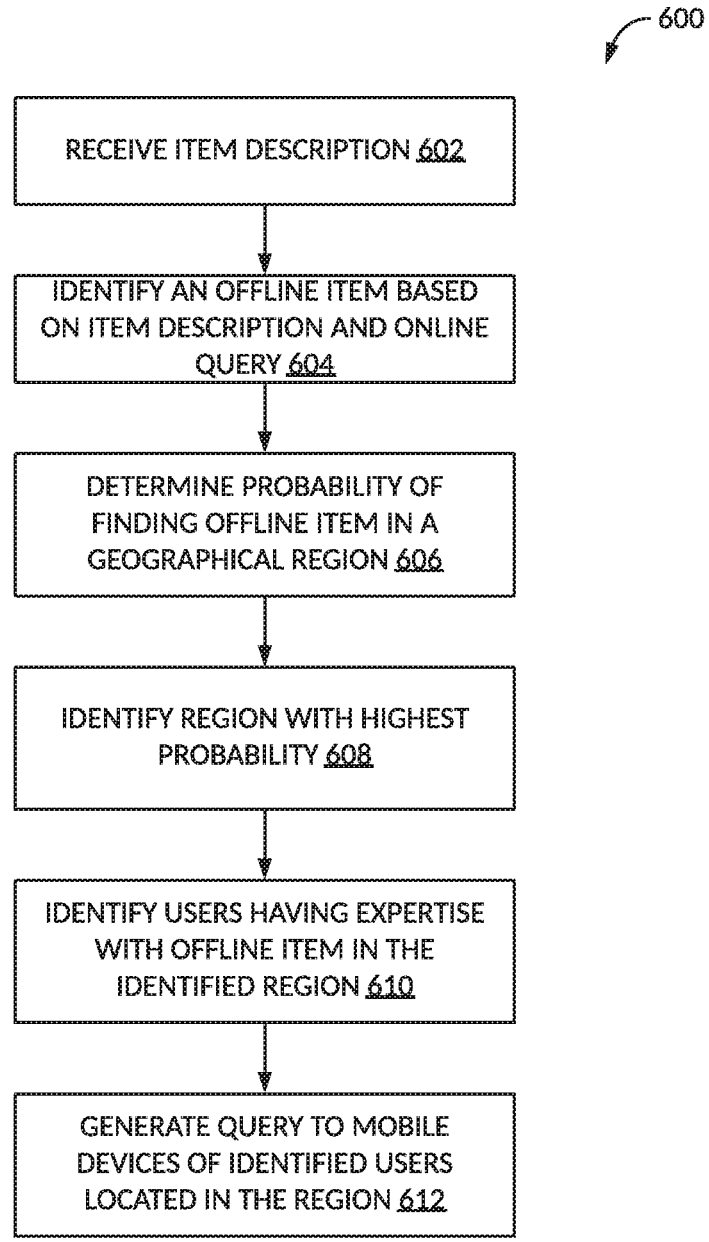
FIG. 6 is a flow diagram illustrating a method for operating an outsourcing procurement engine, in accordance with another example embodiment.

FIG. 6 is a flow diagram illustrating a method 600 for operating an outsourcing procurement engine, in accordance with another example embodiment. At operation 602, the server receives a description of an item. At operation 604, the server identifies an offline item based on the item description and online queries to inventory-level databases of retailers. At operation 606, the server determines a probability of finding the offline item in a corresponding geographical region. At operation 608, the server identifies a geographic region with the highest probability (e.g., for example, Chinese silk is most likely found in Chinatown of a major city or in a major trading city in China). At operation 610, the server identifies expert users (in a field related to the item) that are located in the geographic region with the highest probability. At operation 612, the server generates a query to the mobile devices of the experts in the geographic region with the highest probability.

Figure 7:
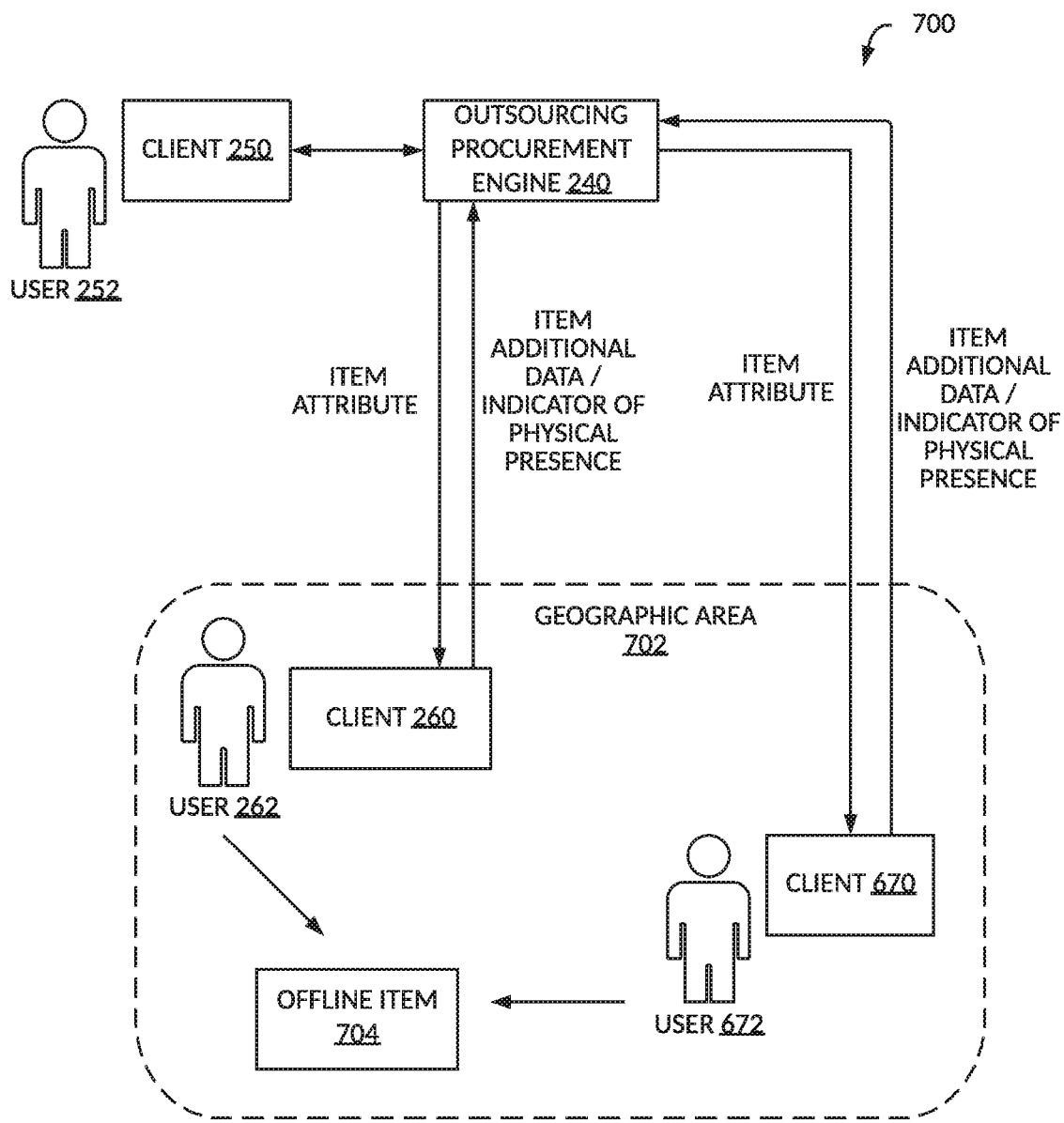
FIG. 7 is a block diagram illustrating an example operation of an outsourcing procurement engine in accordance with an example embodiment.

FIG. 7 is a block diagram illustrating an example operation 700 of an outsourcing procurement engine in accordance with an example embodiment. The user 252 provides item description via client 250 to the outsourcing procurement engine 240. The outsourcing procurement engine 240 identifies clients 260, 670 that are located in the geographic area 702 (determined based on the item description). The outsourcing procurement engine 240 generates a query to the clients 260, 670 and provides item attributes of the offline item 704. Both users 262, 672 will look for the offline item 604 in the geographic area 602. The clients 260 and 670 will report on additional data of the item (provided by the corresponding user) back to the outsourcing procurement engine 240.

Figure 8:
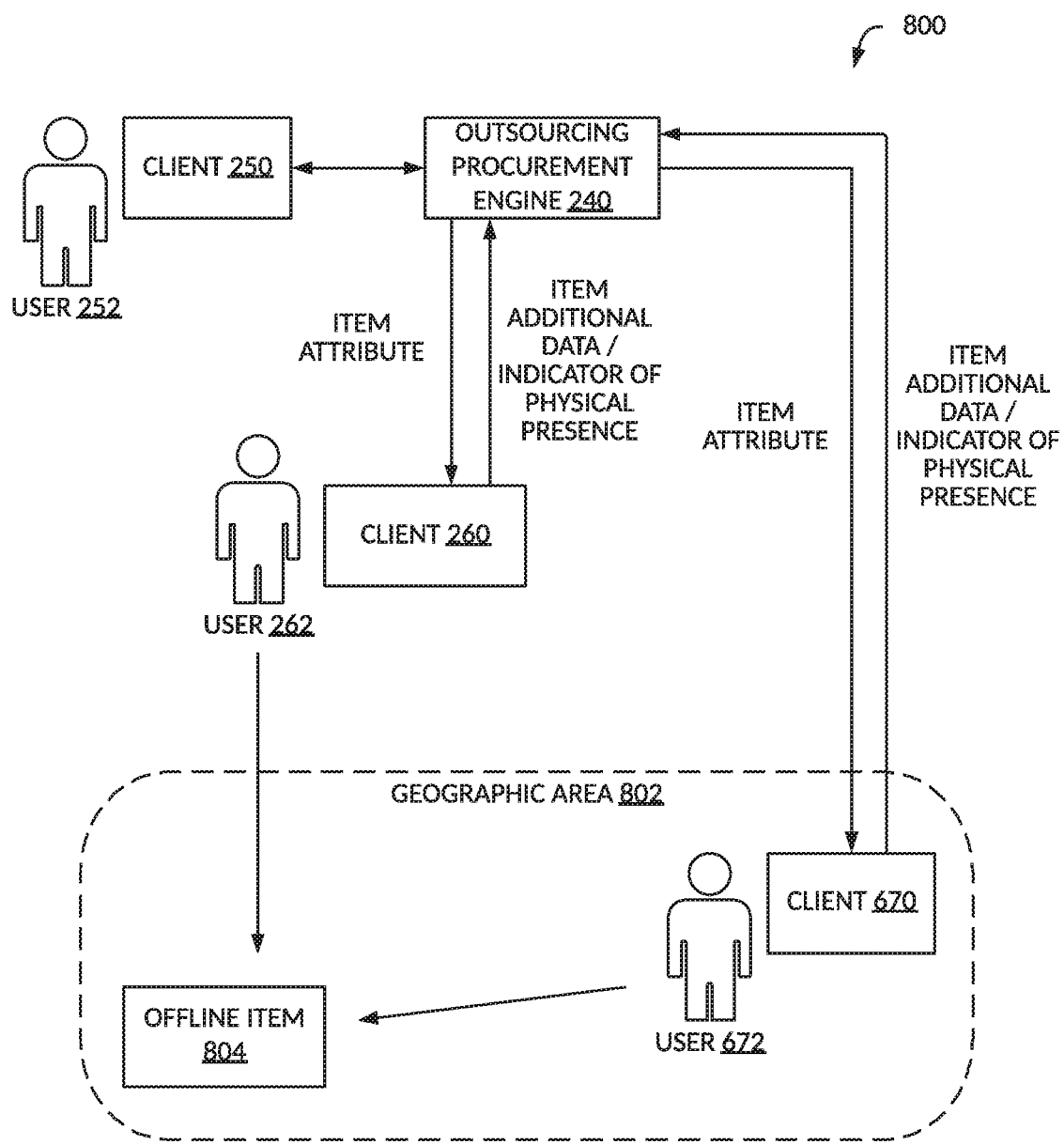
FIG. 8 is a block diagram illustrating an example operation of an outsourcing procurement engine in accordance with another example embodiment.

FIG. 8 is a block diagram illustrating an example operation 800 of an outsourcing procurement engine in accordance with another example embodiment. The user 252 provides an item description via client 250 to the outsourcing procurement engine 240. The outsourcing procurement engine 240 identifies client 670 that is located in the geographic area 802 and client 260 that is within a preset range of the geographic area 602. The outsourcing procurement engine 240 generates a query to the clients 260, 670 and provides item attributes of the offline item 804. Both users 262, 672 will look for the offline item 604 in the geographic area 602. The clients 260 and 670 will report on additional data of the item (provided by the corresponding user) back to the outsourcing procurement engine 240.

Figure 9:
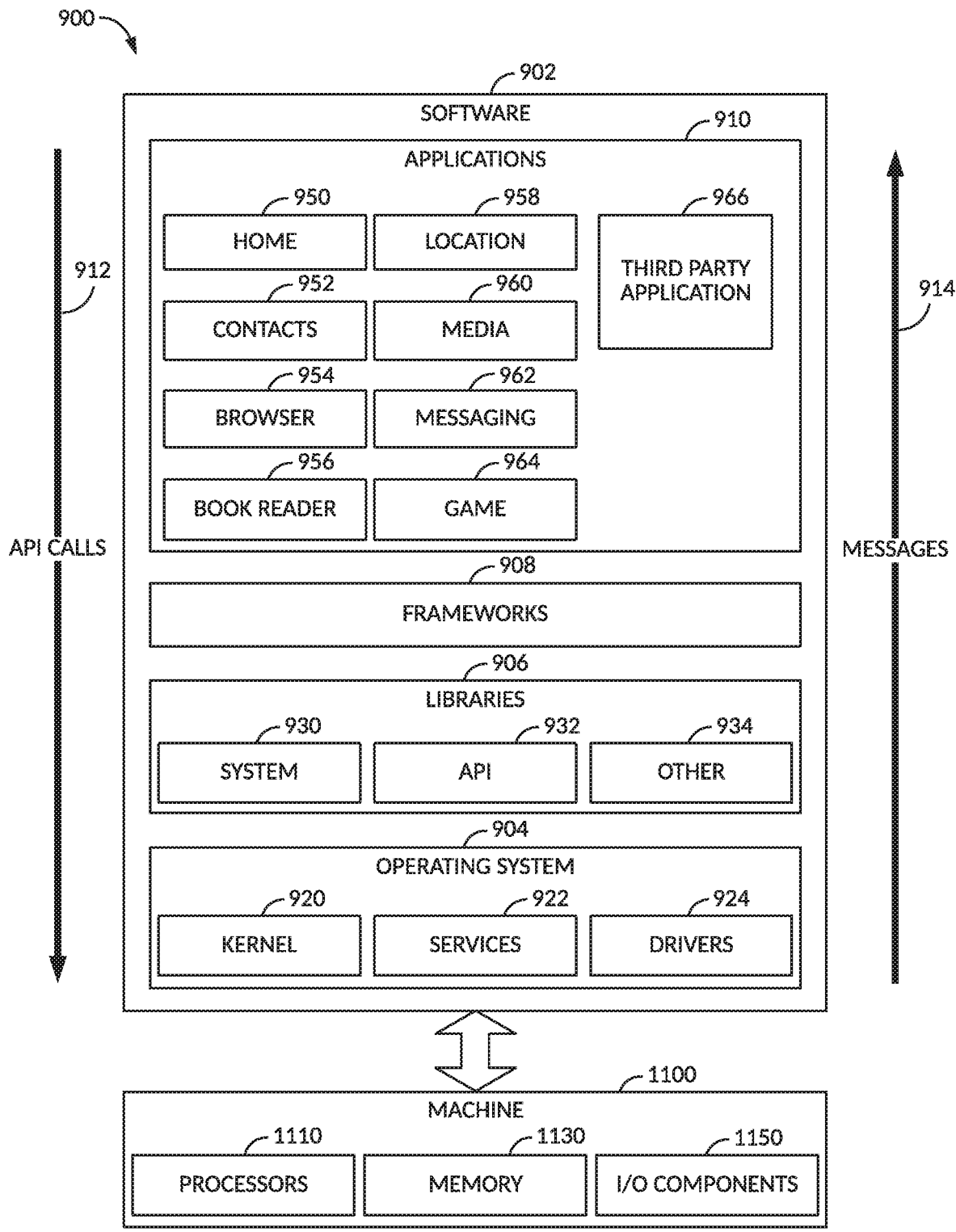
FIG. 9 is a block diagram illustrating an architecture of software, which can be installed on any one or more of the devices described above.

FIG. 9 is a block diagram 900 illustrating an architecture of software 902, which can be installed on any one or more of the devices described above. FIG. 9 is merely a non-limiting example of a software architecture, and it will be appreciated that many other architectures can be implemented to facilitate the functionality described herein. In various embodiments, the software 902 is implemented by hardware such as a machine 1100 of FIG. 10 that includes processors 1110, memory 1130, and input/output (I/O) components 1150. In this example architecture, the software 902 can be conceptualized as a stack of layers where each layer may provide a particular functionality. For example, the software 902 includes layers such as an operating system 904, libraries 906, frameworks 908, and applications 910. Operationally, the applications 910 invoke API calls 912 through the software stack and receive messages 914 in response to the API calls 912, consistent with some embodiments.

In various implementations, the operating system 904 manages hardware resources and provides common services. The operating system 904 includes, for example, a kernel 920, services 922, and drivers 924. The kernel 920 acts as an abstraction layer between the hardware and the other software layers, consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910, according to some embodiments. For example, the frameworks 908 provide various graphic user interface (GUI) functions, high-level resource management, high-level location services, and so forth. The frameworks 908 can provide a broad spectrum of other APIs that can be utilized by the applications 910, some of which may be specific to a particular operating system or platform.

In an example embodiment, the applications 910 include a home application 950, a contacts application 952, a browser application 954, a book reader application 956, a location application 958, a media application 960, a messaging application 962, a game application 964, and a broad assortment of other applications such as a third-party application 966. According to some embodiments, the applications 910 are programs that execute functions defined in the programs. Various programming languages can be employed to create one or more of the applications 910, structured in a variety of manners, such as object-oriented programming languages (e.g., Objective-C, Java, or C++) or procedural programming languages (e.g., C or assembly language). In a specific example, the third-party application 966 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 966 can invoke the API calls 912 provided by the operating system 904 to facilitate functionality described herein.

Figure 10:
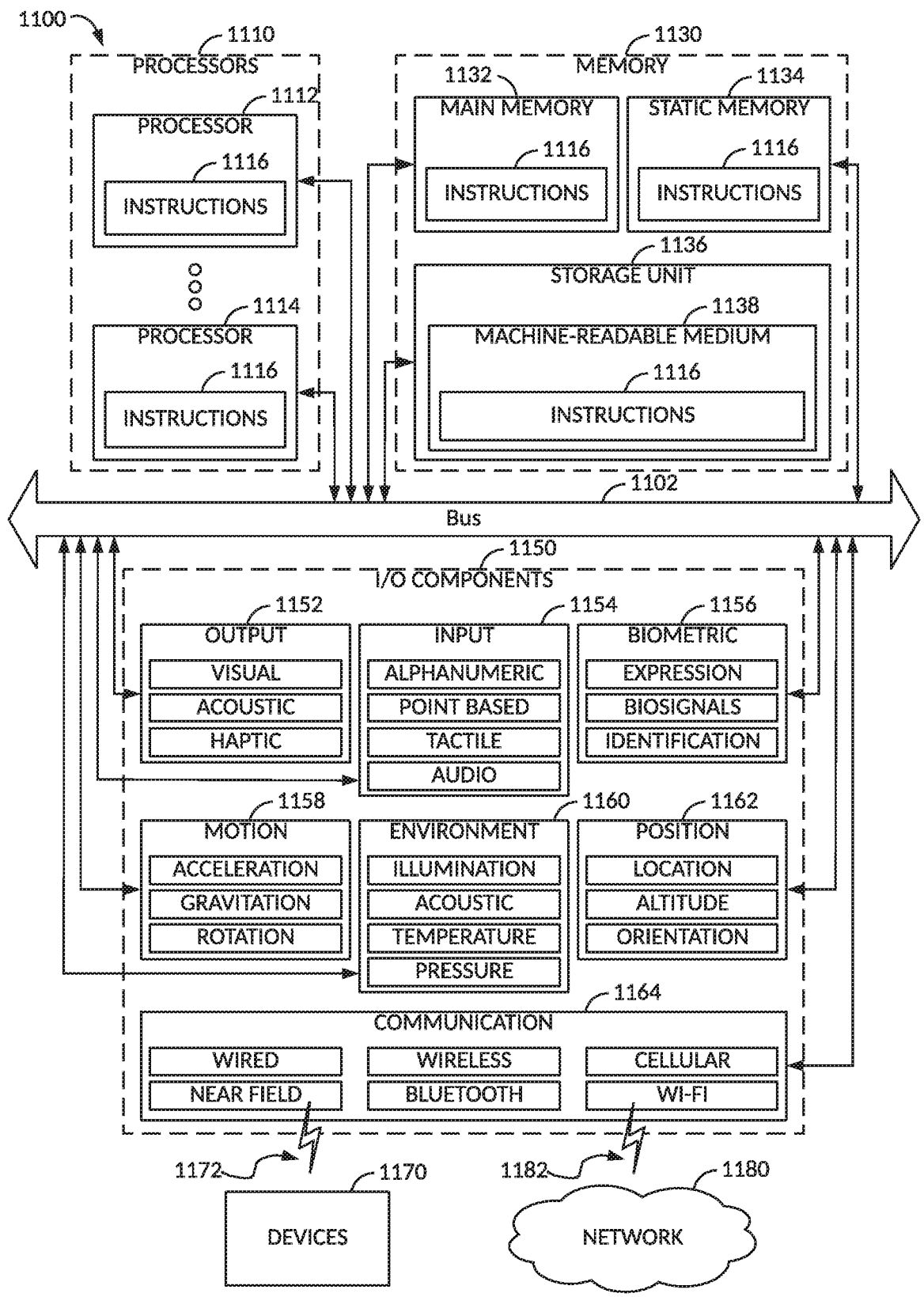
FIG. 10 illustrates a diagrammatic representation of a machine in the form of a computer system within which a set of instructions may be executed for causing the machine to perform any one or more of the methodologies discussed herein, according to an example embodiment.

FIG. 10 illustrates a diagrammatic representation of a machine 1100 in the form of a computer system within which a set of instructions may be executed for causing the machine to perform any one or more of the methodologies discussed herein, according to an example embodiment. Specifically, FIG. 10 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein may be executed. For example, the instructions 1116 may cause the machine 1100 to execute the methods 400, 500, and 600 of FIGS. 4, 5, and 6. Additionally, or alternatively, the instructions 1116 may implement FIGS. 1-3, 7, 8, and so forth. The instructions 1116 transform the general, non-programmed machine 1100 into a particular machine 1100 programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 may include processors 1110, memory 1130, and I/O components 1150, which may be configured to communicate with each other such as via a bus 1102. In an example embodiment, the processors 1110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an application-specific integrated circuit (ASIC), a Radio-Frequency Integrated Circuit (RFIC), another processor, or any suitable combination thereof) may include, for example, a processor 1112 and a processor 1114 that may execute the instructions 1116. The term "processor" is intended to include multi-core processors that may comprise two or more independent processors (sometimes referred to as "cores") that may execute instructions contemporaneously. Although FIG. 10 shows multiple processors 1110, the machine 1100 may include a single processor with a single core, a single processor with multiple cores (e.g., a multi-core processor), multiple processors with a single core, multiple processors with multiples cores, or any combination thereof.

The memory 1130 may include a main memory 1132, a static memory 1134, and a storage unit 1136, each accessible to the processors 1110 such as via the bus 1102. The main memory 1132, the static memory 1134, and the storage unit 1136 store the instructions 1116 embodying any one or more of the methodologies or functions described herein. The instructions 1116 may also reside, completely or partially, within the main memory 1132, within the static memory 1134, within the storage unit 1136, within at least one of the processors 1110 (e.g., within the processor's cache memory), or any suitable combination thereof, during execution thereof by the machine 1100.

The I/O components 1150 may include a wide variety of components to receive input, provide output, produce output, transmit information, exchange information, capture measurements, and so on. The specific I/O components 1150 that are included in a particular machine will depend on the type of machine. For example, portable machines such as mobile phones will likely include a touch input device or other such input mechanisms, while a headless server machine will likely not include such a touch input device. It will be appreciated that the I/O components 1150 may include many other components that are not shown in FIG. 10. The I/O components 1150 are grouped according to functionality merely for simplifying the following discussion, and the grouping is in no way limiting. In various example embodiments, the I/O components 1150 may include output components 1152 and input components 1154. The output components 1152 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1154 may include alphanumeric input components (e.g., a keyboard, a touch screen configured to receive alphanumeric input, a photo-optical keyboard, or other alphanumeric input components), point-based input components a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1150 may include biometric components 1156, motion components 1158, environmental components 1160, or position components 1162, among a wide array of other components. For example, the biometric components 1156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1158 may include acceleration sensor components (e.g., accelerometer), gravitation sensor components, rotation sensor components (e.g., gyroscope), and so forth. The environmental components 1160 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1162 may include location sensor components (e.g., a Global Positioning System (GPS) receiver component), altitude sensor components (e.g., altimeters or barometers that detect air pressure from which altitude may be derived), orientation sensor components (e.g., magnetometers and the like.

Communication may be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 may include a network interface component or another suitable device to interface with the network 1180. In further examples, the communication components 1164 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1170 may be another machine or any of a wide variety of peripheral devices (e.g., a peripheral device coupled via a USB).

Moreover, the communication components 1164 may detect identifiers or include components operable to detect identifiers. For example, the communication components 1164 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code. Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1164, such as location via Internet Protocol (IP) geolocation, location via Wi-Fi® signal triangulation, location via detecting an NFC beacon signal that may indicate a particular location, and so forth.

The various memories (i.e., 1130, 1132, 1134, and/or memory of the processor(s) 1110) and/or the storage unit 1136 may store one or more sets of instructions and data structures (e.g., software) embodying or utilized by any one or more of the methodologies or functions described herein. These instructions (e.g., the instructions 1116), when executed by the processor(s) 1110, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1180 may be an ad hoc network, an intranet, an extranet, a virtual private network (VPN), a local-area network (LAN), a wireless LAN (WLAN), a WAN, a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 may implement any of a variety of types of data transfer technology, such as Single Carrier Radio Transmission Technology (1×RTT), Evolution-Data Optimized (EVDO) technology, General Packet Radio Service (CPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 1116 may be transmitted or received over the network 1180 using a transmission medium via a network interface device (e.g., a network interface component included in the communication components 1164) and utilizing any one of a number of well-known transfer protocols (e.g., HTTP). Similarly, the instructions 1116 may be transmitted or received using a transmission medium via the coupling 1172 (e.g., a peer-to-peer coupling) to the devices 1170. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1116 for execution by the machine 1100, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A server comprising:
   a storage device comprising a database of items and corresponding attributes data;
   a hardware processor configured to perform operations comprising:
   receiving a description of an item from a first computing device;
   determining attributes of the item based on the description of the item;
   determining that the item is not listed in the database based on the identified attributes of the item;
   identifying a geographic region based on the attributes of the item in response to determining that the item is not listed in the database;
   determining that a second computing device is located in the geographic region and is registered with the server;
   in response to determining that the second computing device is located in the geographic region, querying the second computing device for additional attributes of the item;
   receiving additional item data from the second computing device in response to querying the second computing device, the additional item data comprising a presence attribute of the item at the geographic region; and
   updating the attributes data of the item in the database with the additional item data received from the second computing device.

2. The server of claim 1, wherein the operations further comprise:
   providing the updated attributes data of the item to the first computing device,
   wherein determining attributes further comprises:
   determining at least one of a description attribute, a unique identifier attribute, a geographical attribute, or an item category attribute based on the description of the item, the geographical attribute based on a geographical source of the item.

3. The server of claim 1, wherein computing the online presence indicator further comprises:
   querying other servers with the attributes of the item for an online inventory status of the item, the online presence indicator a level of the online inventory status,
   wherein the online presence indicator indicates a poor online presence status when the level of the online inventory status is below a threshold,
   wherein the online presence indicator indicates an online presence status when the level of the online inventory status is above the threshold,
   wherein identifying the geographic region is in response to the online presence indicator indicating the poor online presence status.

4. The server of claim 1, wherein computing the online presence indicator further comprises:
   querying other servers with the attributes of the item for an online inventory status of the item, the online presence indicator indicating a level of the online inventory status; and
   determining that the level of the online inventory status is below a threshold;
   wherein identifying the geographic region is in response to determining that the level of the online inventory status is below the threshold.

5. The server of claim 1, wherein computing the online presence indicator further comprises:
   querying other servers with the attributes of the item for an online inventory status of the item, the online presence indicator indicating a level of the online inventory status,
   wherein the online presence indicator indicates a poor online presence status when the online presence indicator is below a first threshold,
   wherein the online presence indicator indicates a medium online presence status when the level of the online inventory status is above the first threshold and below a second threshold,
   wherein the online presence indicator indicates a high online presence status when the level of the online inventory status is above the second threshold.

6. The server of claim 5, wherein the operations further comprise:
   increasing a size of the geographic region in response to determining the poor online presence status of the item; and
   decreasing the size of the geographic region in response to determining the high online presence status of the item.

7. The server of claim 1, wherein the operations further comprise:

identifying a third computing device associated with an expert user account, the third computing device being registered with the server, the expert user account identifying a user as an expert related to the item category attribute; and generating a second query to the third computing device, the second query identifying the attributes of the item.

8. The server of claim 1, wherein the operations further comprise:

identifying a third computing device associated with an expert user account, the third computing device being registered with the server, the expert user account identifying a user as an expert related to the item category attribute;

determining that the third computing device is located in the geographic region; and generating a second query to the third computing device in response to determining that the third computing device is located in the geographic region, the second query identifying the attributes of the item.

9. The server of claim 1, wherein the operations further comprise:

identifying a third computing device associated with an expert user account, the third computing device being registered with the server, the expert user account identifying a user as an expert related to the item category attribute;

determining that the third computing device is located within a preset range of the geographic region; and generating a second query to the third computing device in response to determining that the third computing device is located within the preset range of the geographic region, the second query identifying the attributes of the item.

10. The server of claim 1, wherein the operations further comprise:

determining that a third computing device is located within a preset range of the geographic region, the third computing device being registered with the server; and generating a second query to the third computing device in response to determining that the third computing device is located within the preset range of the geographic region, the second query identifying the attributes of the item.

11. A computer-implemented method comprising:

receiving, at a server, a description of an item from a first computing device;

determining attributes of the item based on the description of the item;

determining that the item is not listed in the database based on the identified attributes of the item;

identifying a geographic region based on the attributes of the item in response to determining that the item is not listed in the database;

determining that a second computing device that is located in the geographic region and is registered with the server;

in response to determining that the second computing device is located in the geographic region, querying the second computing device for additional attributes of the item;

receiving additional item data from the second computing device in response to querying the second computing device, the additional item data comprising a presence attribute of the item at the geographic region; and updating the attributes data of the item in the database with the additional item data received from the second computing device.

12. The computer-implemented method of claim 11, further comprising:

providing the updated attributes of the item to the first computing device, wherein determining attributes further comprises:

determining at least one of description attribute, a unique identifier attribute, a geographical attribute, or an item category attribute based on the description of the item.

13. The computer-implemented method of claim 11, wherein computing the online presence indicator further comprises:

querying other servers with the attributes of the item for an online inventory status of the item, the online presence indicator a level of the online inventory status, wherein the online presence indicator indicates a poor online presence status when the level of the online inventory status is below a threshold, wherein the online presence indicator indicates an online presence status when the level of the online inventory status is above the threshold, wherein identifying the geographic region is in response to the online presence indicator indicating the poor online presence status.

14. The computer-implemented method of claim 11, wherein computing the online presence indicator further comprises:

querying other servers with the attributes of the item;

determining an online inventory status of the item based on responses from the queries, the online presence indicator indicating a level of the online inventory status; and determining that the level of the online inventory status is below a threshold, wherein identifying the geographic region is in response to the determining that the level of the online inventory status is below the threshold.

15. The computer-implemented method of claim 11, wherein computing the online presence indicator further comprises:

querying other servers with the attributes of the item for an online inventory status of the item, the online presence indicator indicating a level of the online inventory status, wherein the online presence indicator indicates a poor online presence status when the online presence indicator is below a first threshold, wherein the online presence indicator indicates a medium online presence status when the level of the online inventory status is above the first threshold and below a second threshold, wherein the online presence indicator indicates a high online presence status when the level of the online inventory status is above the second threshold.

16. The computer-implemented method of claim 15, further comprising:

increasing a size of the geographic region in response to determining the poor online presence status of the item; and decreasing the size of the geographic region in response to determining the high online presence status of the item.

17. The computer-implemented method of claim 11, further comprising:

identifying a third computing device associated with an expert user account, the third computing device being registered with the server, the expert user account identifying a user as an expert related to the item category attribute; and generating a second query to the third computing device, the second query identifying the attributes of the item.

18. The computer-implemented method of claim 11, further comprising:

identifying a third computing device associated with an expert user account, the third computing device being registered with the server, the expert user account identifying a user as an expert related to the item category attribute;

determining that the third computing device is located in the geographic region; and generating a second query to the third computing device in response to determining that the third computing device is located in the geographic region, the second query identifying the attributes of the item.

19. The computer-implemented method of claim 11, further comprising:

identifying a third computing device associated with an expert user account, the third computing device being registered with the server, the expert user account identifying a user as an expert related to the item category attribute;

determining that the third computing device is located within a preset range of the geographic region; and generating a second query to the third computing device in response to determining that the third computing device is located within the preset range of the geographic region, the second query identifying the attributes of the item.

20. A non-transitory computer-readable storage medium comprising instructions that, when executed by at least one processor of a machine, cause the machine to perform operations comprising:

receiving a description of an item from a first computing device;

determining attributes of the item based on the description of the item;

determining that the item is not listed in the database based on the identified attributes of the item;

identifying a geographic region based on the attributes of the item in response to determining that the item is not listed in the database;

determining that a second computing device is located in the geographic region and is registered with the server;

in response to determining that the second computing device is located in the geographic region, querying the second computing device for additional attributes of the item;

receiving additional item data from the second computing device in response to querying the second computing device, the additional item data comprising a presence attribute of the item at the geographic region; and updating the attributes data of the item in the database with the additional item data received from the second computing device.

* * * * *